(12) United States Patent
Anderson et al.

(10) Patent No.: US 6,259,815 B1
(45) Date of Patent: Jul. 10, 2001

(54) SYSTEM AND METHOD FOR RECOGNIZING SCANNED OBJECTS WITH DEFORMABLE VOLUMETRIC TEMPLATES

(75) Inventors: David B. Anderson, Belmont; Aseem Agarwala, Cambridge; Paul Beardsley, Boston; Joseph W. Marks, Belmont, all of MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/262,376

(22) Filed: Mar. 4, 1999

(51) Int. Cl.[7] .................................................. G06K 9/68
(52) U.S. Cl. ............................................................... 382/218
(58) Field of Search .................................... 382/218, 219, 382/220, 221, 223, 217, 210, 211, 154, 209, 215

(56) References Cited

U.S. PATENT DOCUMENTS

| | | | |
|---|---|---|---|
| 5,768,413 | * 6/1998 | Levin et al. | 382/173 |
| 5,926,568 | * 7/1999 | Chaney et al. | 382/217 |
| 6,009,212 | * 12/1999 | Miller et al. | 382/294 |

OTHER PUBLICATIONS

Rodney A. Brooks; "Model–Based Three–Dimensional Interpretations of Two–Dimensional Images"; *IEEE Transactions on Pattern Analysis and Machine Intelligence*, vol. PAMI–5. No. 2, Mar. 1983, pp. 140–150.

Sven J. Dickinson & Dimitri Metaxas; "Integrating Qualitative and Quantitative Shape Recovery"; International Journal of Computer Vision,, 5(2) :311–33, 1983.

John C. Russ; "Euclidean Distance Map"; *The Image Processing Handbook*, $2^{nd}$ Edition; pp. 463–469.

Franc Solina & Ruzena Bajcsy; "Recovery of Parametric Models from Range Images: The Case for Superquadrics with Global Deformations"; *IEEE Transactions on Pattern Analysis and Machine Intelligence*, 12(2) :131–146, 1990.

* cited by examiner

Primary Examiner—Andrew W. Johns
Assistant Examiner—Seyed Azarian
(74) Attorney, Agent, or Firm—Dirk Brinkman

(57) ABSTRACT

A method recognizes three-dimensional physical objects using three-dimensional deformable templates. A particular object is scanned with a camera to generate volumetric data representing the object. The volumetric data is compared to each of a plurality of three-dimensional deformable templates stored in a database to obtain a score for each comparison. The deforming of the template is done by optimizing an objective function.

19 Claims, 7 Drawing Sheets

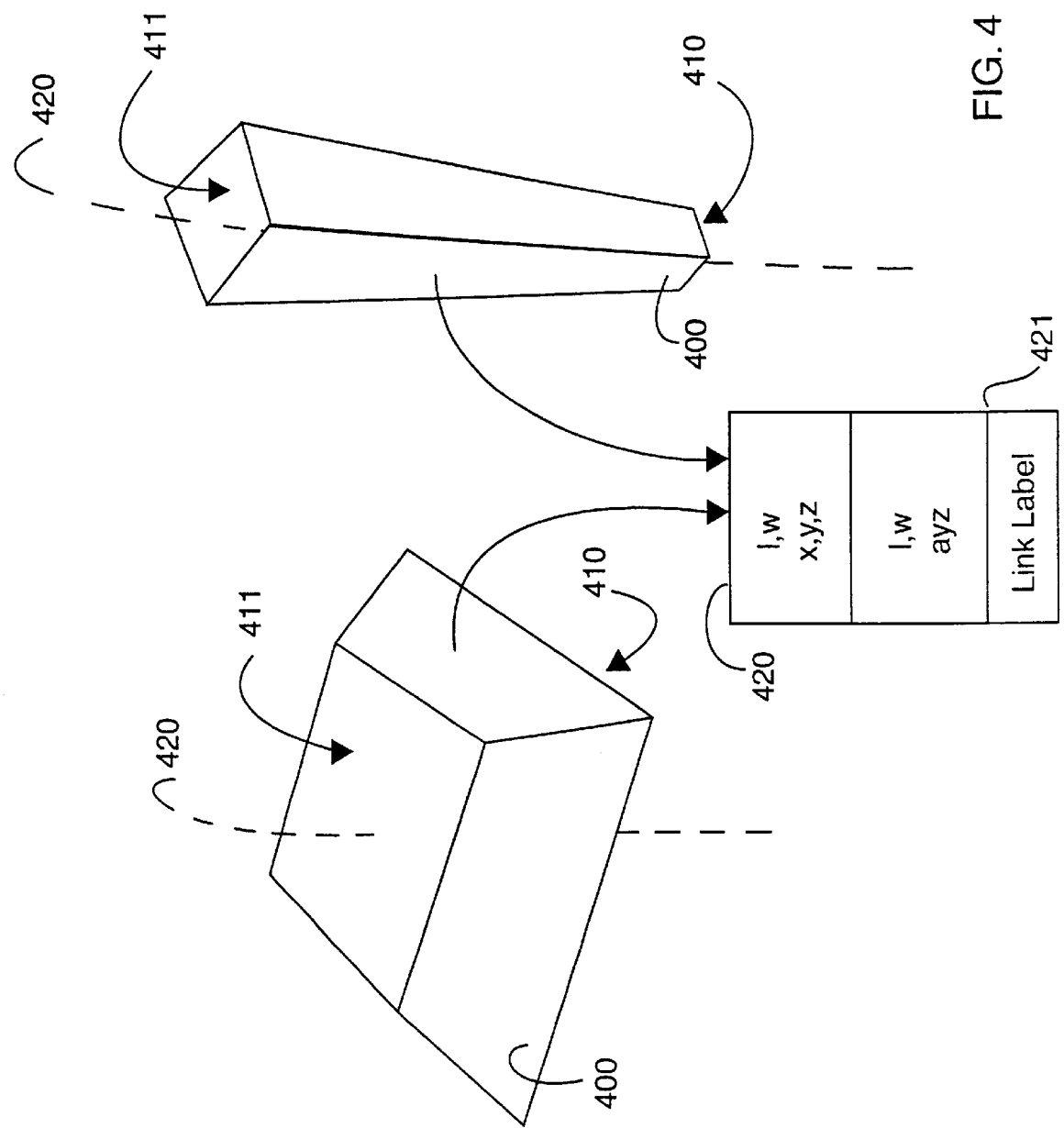

SYSTEM AND METHOD FOR RECOGNIZING SCANNED OBJECTS WITH DEFORMABLE VOLUMETRIC TEMPLATES

FIELD OF THE INVENTION

This invention relates generally to computer vision, and more particularly to recognizing scanned physical objects using deformable three-dimensional templates.

BACKGROUND OF THE INVENTION

A number of techniques are known for recognizing three-dimensional objects from two-dimensional images of the objects. Brooks, in "Model-based 3D interpretation of 2D images," IEEE Trans. on Pattern Analysis and Machine Intelligence, 5(2):140–150, 1983, describes the use of parameterized objects for object recognition. There the objects are generalized cylinders.

Solina et al., in "Recovery of parametric models from range images," IEEE Trans. on Pattern Analysis and Machine Intelligence, 12(2):131–146, 1990, describe how to recover parametric objects from range data by minimizing surface distances, for example, using superquadrics with global deformations. There is no object recognition here.

Dickenson et al. survey a number of different shape recovery techniques in "From volumes to views: An approach to 3D object recognition," Computer Vision, Graphics and Image Processing: Image Understanding, 55(2):130–154, 1992.

Most prior art template matching methods do not use full volumetric templates. The templates are either two-dimensional for image matching, or in the case of range data, the templates are surface based. In addition, the prior art templates are relatively unconstrained to maximize the likelihood of matching. Unconstrained templates require the manipulation of a large number of parameters.

Therefore, it is desired to provide a vision-based recognition system that can identify physical objects having multiple constituent parts. Furthermore, it is desired to parse the identified objects so that they can be animated in virtual environments.

SUMMARY OF THE INVENTION

Provided is a computer vision system for recognizing and parsing common toy-like objects, such as people, animals, trees, houses, cars, boats, birds, insects, etc. A toy object can be made of modeling clay, or other suitable materials. Using a single calibrated camera, a sequence of images of the model object is acquired while the object is rotated on a turn-table. A 3D volumetric scan of the object is recovered from the sequence of 2D images.

The volumetric scan is compared against sets of three-dimensional deformable templates. There is one set of three-dimensional deformable templates for each category of object. This process allows one to both classify the object and to identify its constituent parts. Using this information, it becomes possible to recognize and parse, for example, an ambulatory object, such as a biped or a quadruped, and to place the object in an appropriate virtual environment for animation.

More particularly, a method recognizes three-dimensional physical objects using three-dimensional deformable templates. A particular object is scanned with a camera to generate volumetric data representing the object. The volumetric data is compared to each of a plurality of three-dimensional deformable templates stored in a database to obtain a score for each comparison. The templates are deformed while the score of an objective function is optimized.

The three-dimensional deformable template that receives the highest score determines the category of the object, and the template is used to parse the object into its constituent parts, and the parts of the object can than be rendered and animated in a virtual world environment.

BRIEF DESCRIPTION OF THE DRAWINGS

FIG. 1b shows clay models to be recognized by the system of FIG. 1a;

FIGS. 4a–4b are truncated rectangular pyramids used to form the volumetric templates of FIGS. 3a–3m;

DETAILED DESCRIPTION OF PREFERRED EMBODIMENTS

System Overview

Figure 1A:
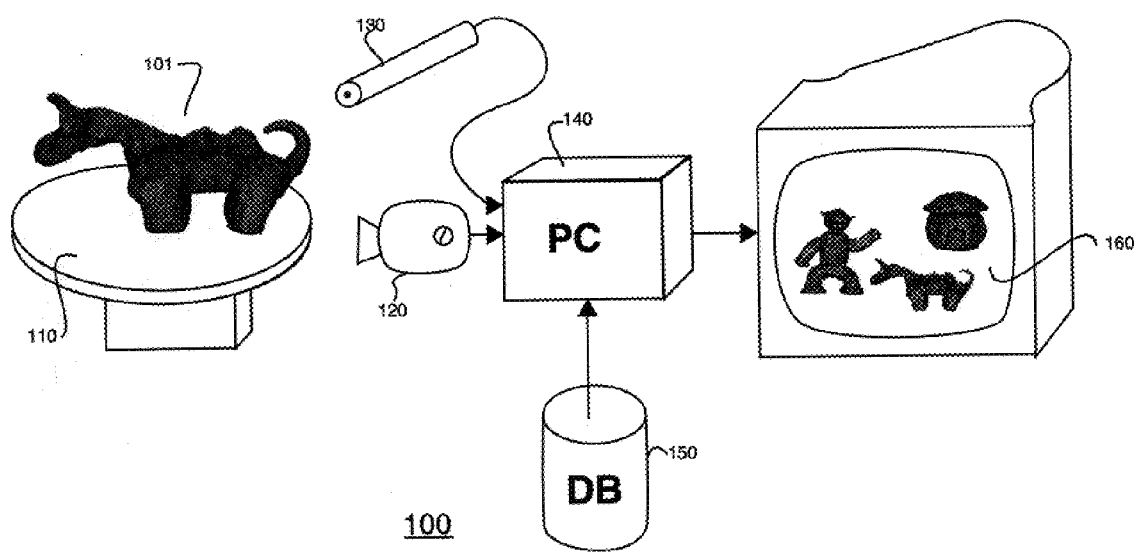
FIG. 1a is a block diagram of a recognition system according to the invention.
Figure 1B:
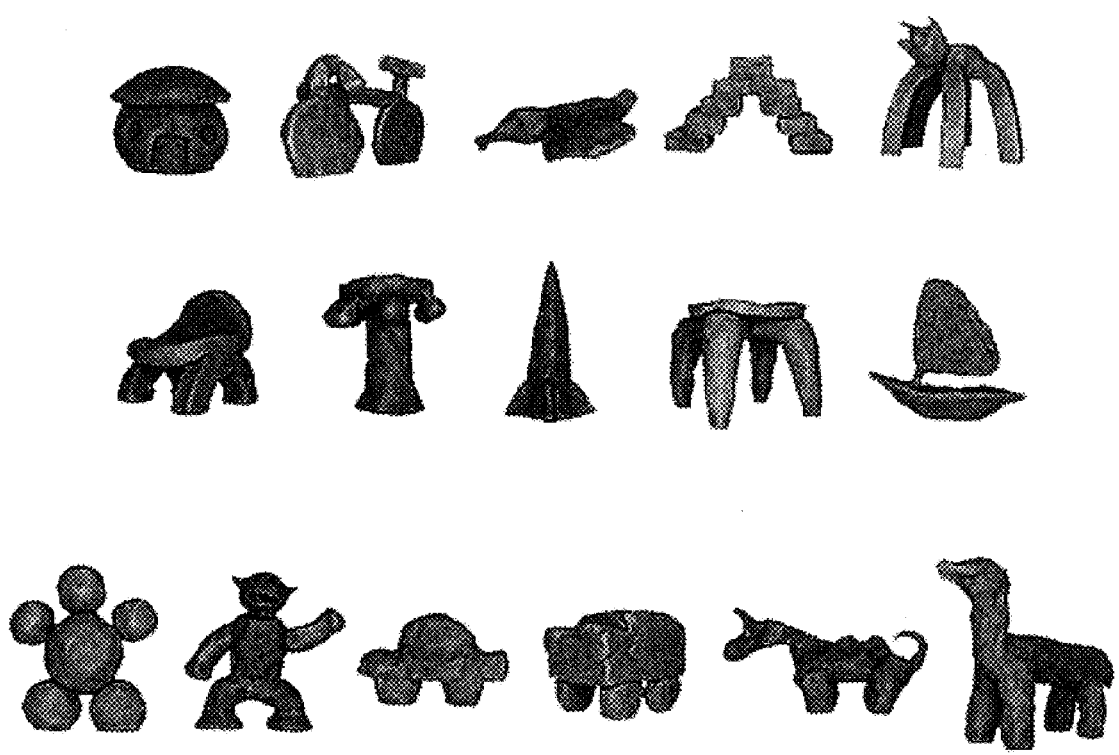

FIG. 1a shows an object recognition system 100 according to our invention. The system 100 includes a motorized turn-table table 110 for positioning a physical object 101. We construct the object from uniformly colored modeling clay. Clay was chosen because it is a modeling material that is easy to obtain and use. The clay can be used to model toy representations of common objects such as houses, people, animals, insects, furniture, cars, boats, planes, and the like, as shown in FIG. 1b.

The system 100 according to our invention can be used by a relatively unsophisticated user, for example, a small child, to populate a virtual reality world with animated characters and items of their own making.

The user forms a toy model and places it on the turn-table. A camera 120 and an optional laser striper 130 scan the object while it rotates. The output of the camera and striper are processed by a computer system 140 to generate a volumetric scan. The computer system, for example, a PC or laptop, has access to a database (DB) of 3D deformable templates 150. The scan is compared to the stored three-dimensional deformable templates to identify the object. After the object has been recognized, the scanned object can be parsed into its constituent parts to populate a virtual environment 160 with animated figures resembling the molded objects.

System Operation

Figure 2:
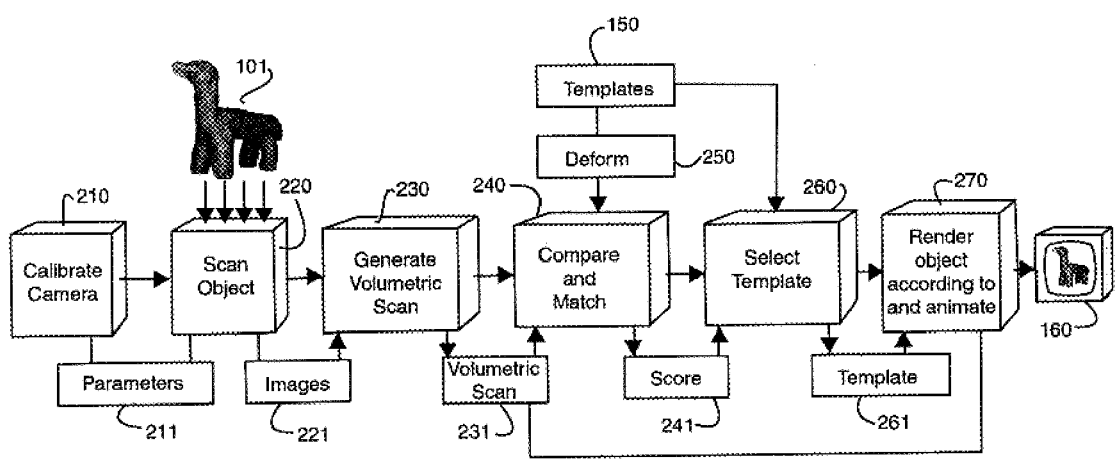
FIG. 2 is a flow diagram of a process for recognizing physical objects.
Figure 3A:
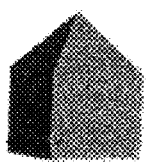
FIGS. 3a–3m depicts representative three-dimensional deformable templates used by the system of FIG. 1.
Figure 3B:
Figure 3C:
Figure 3D:
Figure 3E:
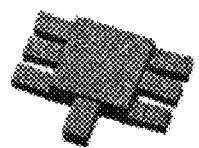
Figure 3F:
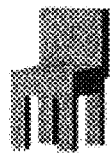
Figure 3G:
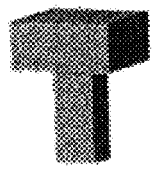
Figure 3H:
Figure 3I:
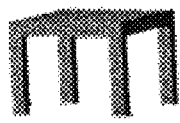
Figure 3J:
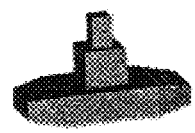
Figure 3K:
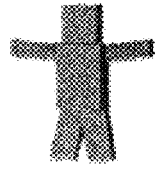
Figure 3L:
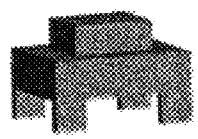
Figure 3M:
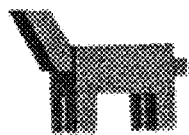

FIG. 2 is a flow diagram of a process 200 for recognizing scanned physical objects according to our invention. We calibrate (210) the camera from images of an object of known dimensions and placed at a fixed orientation on the turn-table. This step 210 determines the camera parameters 211.

The object 101 to be scanned is placed upright and face forward on the turn-table 110. It is convenient for our comparing process to have the object placed in a known orientation. Inferring the orientation of the object is also possible. However, for applications that involve a cooperative user, inference of orientation is not necessary.

The camera captures an image sequence 221 of the object while the object rotates and is scanned 230. A volumetric scan 231 is generated (230) from silhouettes. This is a well-known technique, for example, see Baumgart, "Geometric modeling for computer vision," Technical Report AIM-249, AI Laboratory, Stanford University, October 1974.

For example, we generate volumetric data, voxels, from 180 images taken a uniform 2° apart by the camera 120. This approach works well for most objects. However, for objects that include significant concavities, we use the laser striper to refine the shape of the object. For example, an additional 180 images can be taken with the laser striper 130. The use of silhouettes and laser striping is well suited to our smooth-surfaced and single-colored clay objects. A particular scanned volume is subsampled to a resolution of 128×128×128 voxels for the purpose of three-dimensional deformable template matching.

Our recognition system 100 compares the scanned images 221 of the object to sets of parameterized object templates 150. The templates are deformed 250 to best match the object. Each match between a particular deformed template and the object is given a score 241. The maximum score is used to select 260 the best matching template 261, and the selected 3D template can be used to parse the object into its various constituent parts. The volumetric scan of the object is rendered and animated 270 according to the selected template, and viewed or manipulated in the virtual world 160.

Three-dimensional Deformable Templates

As shown in FIGS. 3a–3m, each template represents a physical object as a number of articulated links. The templates in FIGS. 3a–3m respectively represent a house, a bicycle, a bird, a bridge, an insect, a chair, a tree, a rocket, a table, a boat, a biped, a car, and a quadruped.

As shown in FIGS. 4a and 4b, each link is in the form of a truncated rectangular pyramid 400, hereinafter a link. By definition, a truncated rectangular pyramid has two rectangular bases 410–411 that are orthogonal to a major axis 420. Each link is completely defined by ten parameters, the two length and width (l, w) parameters of each base, and the three (x, y, z) coordinates of the center of each base (2×5).

Also associated with each template is a label uniquely identifying the template, for example, "biped," or "house." Each link also has an associated link label 421, e.g., "left-leg,", "roof," or, "head."

As an advantage, rasterizing links to determine what 3D space they occupy is relatively easy which makes the comparing of physical objects to our three-dimensional deformable templates efficient. During rasterization, each voxel generated receives the link label 421 of the associated part.

The links can be connected to each other at their corners (eight), at the centers of any of their faces (six), or any other easy-to-compute connecting point.

Figure 5:
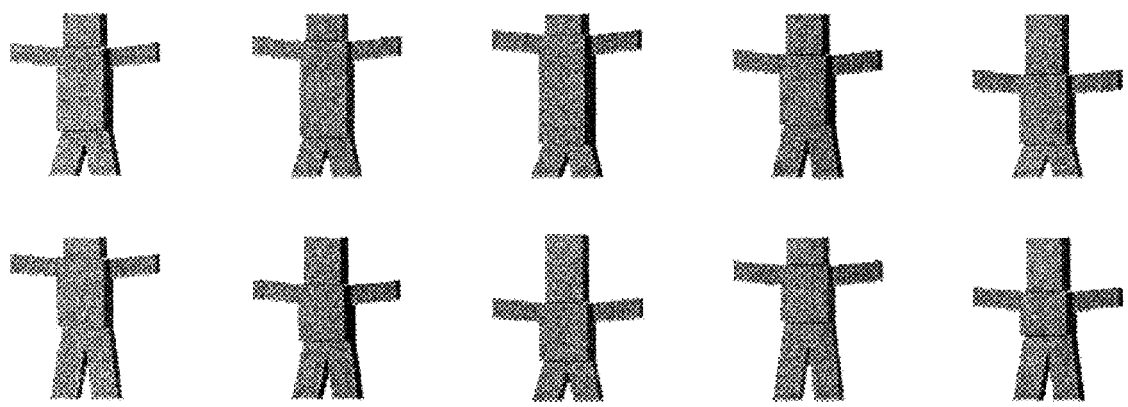
FIG. 5 shows a set of three-dimensional deformable templates for one category.

As shown in FIG. 5, for each object category, we store a set of three-dimensional deformable templates 500 in the database 150 of FIG. 1, for example ten. The templates for a particular object category, here a biped, differ only in the relative proportions and orientations of their constituent links. This provides the comparing process with multiple starting points, one starting point for each of the ten templates in the set, thereby reducing any chances of matching on object parts in ways that are locally optimal but globally inferior.

Constraints

A number of the template parameters are constrained relative to each other. Some of these constraints derive implicitly from the enforced connectedness of links in a particular articulated linkage. Other constraints are the result of explicit constraints that apply to link-size parameters, e.g., a constraint that the dimensions of the base rectangles for both arm links in a biped should be the same.

When these constraints are applied, the number of free parameters for a six link biped template reduces to a manageable number, twenty-five. By modifying these parameters, the comparing and matching process 200 can deform a template to best match a volumetric scan of a given physical object.

Objective Function

In our optimization-based approach, we quantify a best match by using an objective function $f$ defined as:

$$f = S/V + E/V + D/v$$

where S is a superposition term, E is an excess penalty term, and D is a deformation term. The terms V and v are normalization terms. The best match maximizes the score of the objective function $f$.

Superposition

Each voxel occupied by both the rasterized object template and the scanned object contributes +1 to the superposition term of the objective-function.

Excess

The excess term penalizes voxels occupied by the rasterized template but not by the object. A simple approach would add a score of −1 for each such voxel. In order to obtain better results, we add a score of −r, where r is the distance to the nearest occupied voxel in the object. This value can be computed for each voxel by an efficient two-pass algorithm as described by Russ in "The Image Processing Handbook," CRC Press, 1998. The advantage of this distance-based penalty is that its gradient still gives useful information even when there is minimal overlap between the template and object.

Deformation

Without some penalty for excessive deformation, templates can sometimes achieve excellent superposition and excess scores through absurd contortions. Deformation beyond a certain threshold is therefore penalized by an exponential function of the distance between the original and deformed (l, w) parameters and the (x, y, z) coordinates of the links.

Normalization

The normalization function divides the superposition and excess terms by the number of occupied voxels in the scanned volume, which normalizes for the volume of the object (V). The deformation term is divided by the number of link vertices, normalizing for the complexity of the object template (v).

Comparing

Figure 6:
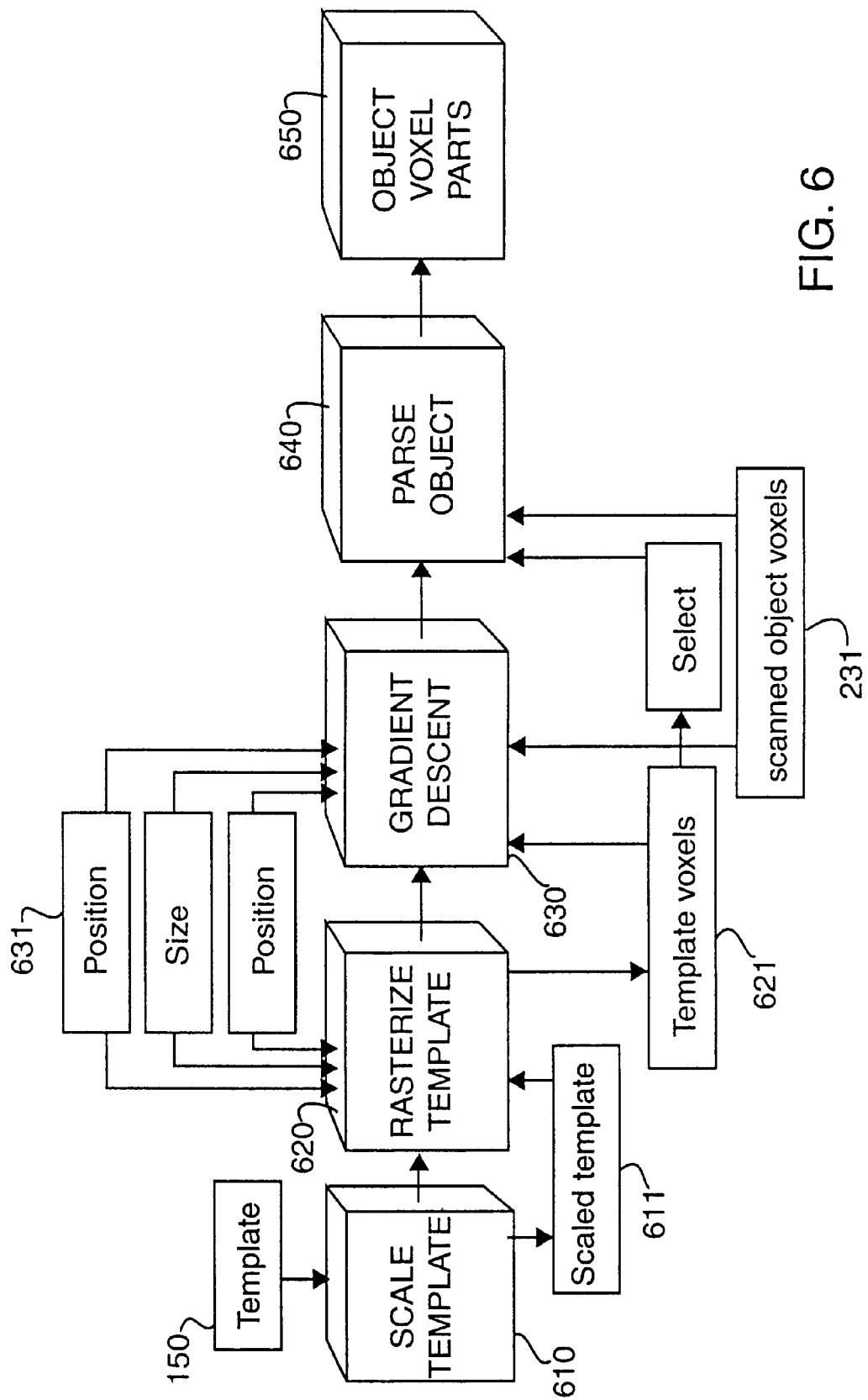
FIG. 6 is a flow diagram of a matching and parsing process according to the invention.

Given this objective function $f$, the comparing and matching 600 proceeds as shown in FIG. 6. The comparing is performed against all object templates 150, ten for each category of object. First, the template 150 is adjusted for fit in step 610. We do this by scaling the template in all three dimensions so that all of the link endpoints lie just within a bounding box surrounding the scanned object. There is no need to normalize the template for orientation because we assume that scanned objects have been placed upright and facing forward.

The scaled template 611 is rasterized 620 to generate a corresponding volumetric data set (voxels) 621 that can be compared with the scanned volumetric data 231.

Comparing applies a gradient-descent method to optimize the objective function $f$. We use the conjugate-gradient method of gradient-descent, approximating the partial derivatives of the objective function by central differences, see Press et al. in "Numerical Recipes in C," Cambridge University Press, 1988.

For best results, we run the rasterizing and gradient-descent steps to quiescence three times in succession, for position, size, and again position 631. First, we vary only the location parameters of the link template, then only the size parameters, and finally only the location parameters again, rasterizing the template each run.

We also schedule the relative weights of the objective-function terms over the three runs: the superposition and excess terms decrease in significance, and the deformation term increases. We determined reasonable values for the weights empirically.

Parsing

After the best-matching template has been found for a given object (the one with the maximum score), the selected template is used to parse 640 the object into its constituent volumetric parts 650. For example, if an object is recognized as a biped, then the matching biped template is used to classify the object voxels that constitute the head, arms, legs, and torso by labeling the object voxels with the template label and the link labels 421 of FIG. 4, for example, "biped_left-leg."

Our voxel classification, during parsing, is based on the shortest distance from each voxel of the scanned object to each voxel of the rasterized link throughout the space occupied by the scanned object. Voxels are then assigned to their closest links. If there are ties, the ties are broken by considering the distance to the center axes of the link, i.e., the line segment that connects the center of the bases of the link.

After the object voxels have been parsed, the data representing the object can be manipulated in various ways depending on the application.

Applications

After an object is recognized, the object can be brought to life in a virtual world environment. For example, for a quadruped, body measurements, masses, and moments of inertia can be specified. These values can be passed as input to an adaptive control and simulation system for a four-legged robot, which adapts an existing control system to the dynamics of this particular object.

The motion data computed by the simulation can be used to animate the object template, which in turn animates the scanned volume by moving its voxels in concert with the links of the template to which they were assigned in the parsing phase.

Care must be taken to avoid the introduction of tears and cracks in the object as it deforms during animation. For example, having all links influence the movement of a voxel in inverse proportion to the square of their distance from the voxel reduces tears at the junctions of different object regions.

As an advantage, our invention allows an unsophisticated user to mold animate and inanimate objects using simple-to-manipulate modeling clay. The objects are automatically recognized, and constituent parts of the objects can be identified. Thus, a volume scan of the object can be manipulated at the part level to generate an animation sequence populated with things that exactly resemble the molded objects.

It is to be understood that various other adaptations and modifications may be made within the spirit and scope of the invention. Therefore, it is the object of the appended claims to cover all such variations and modifications as come within the true spirit and scope of the invention.

We claim:

1. A method for recognizing a physical object using templates, comprising the steps of:
    scanning the object to generate volumetric data representing the object;
    comparing the volumetric data to a plurality of sets of three-dimensional deformable templates stored in a database to obtain scores; and
    selecting a particular three-dimensional deformable template that matches the volumetric data based on a maximum score.

2. The method of claim 1 wherein the object is scanned with a camera while rotating.

3. The method of claim 1 wherein the object is scanned with a laser striper to generate surface detail.

4. The method of claim 1 wherein each three-dimensional deformable template is formed from connected links.

5. The method of claim 4 wherein each link is in the form of a truncated pyramid.

6. The method of claim 5 wherein each link is defined by length and width parameters of each base, and the x, y, z parameters of the center of each base.

7. The method of claim 4 wherein the links are connected to each other at corners of the links.

8. The method of claim 5 wherein the links are connected to each other at the centers of any of the faces.

9. The method of claim 1 further comprising the steps of:
    scoring each comparison between the volumetric data and each three-dimensional deformable template using an objective function $f$.

10. The method of claim 9 wherein $f = S/V + E/V + Dv$ where S is a superposition term, E is an excess penalty term, and D is a deformation term, and V and v are normalization terms where V measures voxels in the volumetric data and v measures vertices of links of the deformable template.

11. The method of claim 10 wherein each voxel occupied by both the rasterized three-dimensional deformable template and the volumetric data adds +1 to the superposition term of the objective function.

12. The method of claim 10 wherein voxels occupied by the rasterized three-dimensional deformable template but not by the volumetric data decrease the excess term.

13. The method of claim 10 wherein the deformation term decreases the excess term exponentially for excessive deformation.

14. The method of claim 10 wherein the superposition term and the excess terms are divided by the number of occupied voxels in the volumetric data, and the deformation term is divided by the number of link vertices.

15. The method of claim 1 further including the steps of:
    scaling each three-dimensional deformable template to fit the volumetric data;
    rasterizing the scaled three-dimensional deformable template; and
    applying a gradient descent to optimize an objective function to generate the scores.

16. The method of claim 1 further including parsing the volumetric data using the particular three-dimensional deformable template.

17. The method of claim 16 wherein the volumetric data are labeled according to labels associated with the particular three-dimensional deformable template.

18. The method of claim 16 further including animating the parsed volumetric data in a virtual environment.

19. A system for recognizing physical object using templates, comprising:

a camera scanning the object to generate volumetric data representing the object;

means for comparing the volumetric data to a plurality of sets of three-dimensional deformable templates stored in a database to obtain scores; and means for selecting a particular three-dimensional deformable template that matches the volumetric data based on a maximum score.

* * * * *